US009906652B2

(12) United States Patent
Gonzalez de Langarica et al.

(10) Patent No.: US 9,906,652 B2
(45) Date of Patent: Feb. 27, 2018

(54) SHIFTING OF COMMUNICATION SESSION CHARGES

(71) Applicant: Ericsson AB, Stockholm (SE)

(72) Inventors: Ester Gonzalez de Langarica, Stockholm (SE); Jerker Zetterlund, Bromma (SE); Afshin Abtin, Sollentuna (SE); Nils Hänström, Huddinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 103 days.

(21) Appl. No.: 14/856,814

(22) Filed: Sep. 17, 2015

(65) Prior Publication Data
US 2017/0085720 A1 Mar. 23, 2017

(51) Int. Cl.
*H04M 15/08* (2006.01)
*H04M 15/00* (2006.01)
*H04L 29/06* (2006.01)

(52) U.S. Cl.
CPC ........ *H04M 15/08* (2013.01); *H04L 65/1006* (2013.01); *H04L 65/1069* (2013.01); *H04M 15/8228* (2013.01); *H04M 15/88* (2013.01)

(58) Field of Classification Search
None
See application file for complete search history.

(56) References Cited

U.S. PATENT DOCUMENTS

| | | | | |
|---|---|---|---|---|
| 2005/0021351 A1* | 1/2005 | Koskinen | ............... | G06Q 20/10 705/39 |
| 2007/0174400 A1* | 7/2007 | Cai | ........................ | H04L 12/14 709/206 |
| 2009/0097624 A1* | 4/2009 | Sangberg | ............... | H04M 15/00 379/114.21 |
| 2012/0246326 A1* | 9/2012 | Singh | ..................... | H04L 12/14 709/227 |
| 2014/0168703 A1* | 6/2014 | Nakagawa | ........... | H04N 1/0022 358/1.15 |

OTHER PUBLICATIONS

Garcia-Martin, et al.: "Private Header (P-Header) Extensions to the Session Initiation Protocol (SIP) for the 3$^{rd}$-Generation Partnership Project (3GPP)". Network Working Group. Request for Comments: 3455. Jan. 2003.

* cited by examiner

*Primary Examiner* — Brian Roberts

(57) ABSTRACT

In accordance with certain embodiments, disclosed herein is a method for shifting charges. The method includes receiving a request for a communication session between at least two endpoints. The request comprises a charging preference that indicates a request for a shift in at least a portion of the charges associated with the communication session. The method further includes transmitting a message to a charging system indicative of the request for the shift in charges based on the charging preference. The method additionally includes determining whether to establish the communication session between the at least two endpoints or to reject the communication session between the at least two endpoints. The method also includes, based on the determination, facilitating in the establishment of the communication session or the rejection of the communication session.

15 Claims, 7 Drawing Sheets

SHIFTING OF COMMUNICATION SESSION CHARGES

TECHNICAL FIELD

Embodiments presented herein relate to establishing communication sessions, and in particular, to methods, network nodes, endpoints, computer programs, or computer program products for the shifting of charges of communication sessions.

BACKGROUND

Voice calls are typically charged by duration (i.e., how long the voice call lasts). However, for video call the charging model is more complex. Some operators spit the charges for a video call such that the voice, or audio, portion of the video call is charged against the user's voice plan (based on the duration of the video call) and the video, or visual, portion of the video call is charged against the user's data plan (e.g., based on the amount of data used during the video call). With this charging model, a user receiving a video call or receiving a file transfer during a call will be charged by the data they transfer (send and receive) in the access, regardless of whether the user placed the call or received the call. With respect to traditional voice calls (e.g., Plain Old Telephone Service (POTS), Public Switched Telephone Network (PSTN)) there has existed the ability to make collect calls or reverse charge calls in which the calling party wants to place a call at the called party's expense. There currently does not exist a means for requesting that charges for a communication session be shifted from the standard allocation in a non-PSTN context, such as one involving mixed media (e.g., voice and video, or voice and data, etc.). For example, in current Session Initiation Protocol (SIP) implementations there is no mechanism that allows a user to request, or offer, to shift all, or a portion, of the charges incurred by another endpoint not associated with the user.

SUMMARY

An object of embodiments herein is to provide methods, network nodes, endpoints, computer programs, or computer program products for the shifting of charges for a communication session.

According to certain embodiments, a method for shifting charges includes receiving a request for a communication session between at least two endpoints. The request comprises a charging preference that indicates a request for a shift in at least a portion of the charges associated with the communication session. The method further includes transmitting a message to a charging system indicative of the request for the shift in charges based on the charging preference. The method additionally includes determining whether to establish the communication session between the at least two endpoints or to reject the communication session between the at least two endpoints. The method also includes, based on the determination, facilitating in the establishment of the communication session or the rejection of the communication session.

In some embodiments, the method further includes receiving a response message from the charging system and determining whether to establish or reject the communication session based on the response message from the charging system.

In certain embodiments, the method additionally includes receiving a response message from a first endpoint. The response message comprises an indication of whether the requested shift in charges during the communication session is accepted or rejected.

In particular embodiments, the method also includes transmitting a query message comprising the charging preference to a first endpoint. The method further includes receiving an initial response message from the first endpoint. The initial response message does not provide an indication of whether the requested shift in charges is accepted or rejected. The method additionally includes determining, from the initial response message, that the first endpoint did not provide a suitable response to the query message. The method also includes transmitting a second message to the first endpoint. The second message comprises a reformatted request. The reformatted request is indicative of the requested shift in charges and comprises a format that is different than the format of the query message.

In certain embodiments, the charging preference comprises an indication of at least one media type. The charging preference with the indication of the at least one media type indicative of a request that the shift in charges be related to the at least one media type specified in the charging preference.

In particular embodiments, the first and second endpoints are currently in an established first communication session with one another when the request for the communication session is received. The requested communication session is for a different media type than the established first communication session.

According to particular embodiments, a network node for shifting charges comprises an interface and a processor coupled to the interface. The interface is configured to receive a request for a communication session between at least two endpoints. The request comprises a charging preference that indicates a request for a shift in at least a portion of the charges associated with the communication session. The interface is also configured to transmit a message to a charging system indicative of the request for the shift in charges based on the charging preference. The processor is configured to determine whether to establish the communication session between the at least two endpoints or to reject the communication session between the at least two endpoints. The processor is further configured to, based on the determination, facilitate in the establishment of the communication session or the rejection of the communication session.

According to some embodiments, a network node for shifting charges comprises a processor and non-transitory computer readable storage media, the storage media containing instructions executable by the processor. The network node is operative to receive a request for a communication session between at least two endpoints. The request comprising a charging preference indicating a request for a shift in at least a portion of the charges associated with the communication session. The network node is further operative to transmit a message to a charging system indicative of the request for the shift in charges bases on the charging preference. The network node is also operative to determine whether to establish the communication session between the at least two endpoints or to reject the communication session between the at least two endpoints. The network node is additionally operative to, based on the determination, facilitate in the establishment of the communication session or the rejection of the communication session.

Advantageously, one or more embodiments provide endpoints with the option to offer, or request, that the charges associated with all, or a portion of, a communication session, be shifted from the standard allocation (e.g., each user is responsible for the charges incurred by his, or her, respective endpoint). This may, for example, allow a company to provide truly free video based technical support. This may also encourage additional usage of video services. This may also allow for service providers, or other companies who offer communication sessions, with more variety and flexibility in how responsibilities for the charges for the communication sessions are handled.

It is to be noted that any feature of any of the above embodiments may be applied to any other embodiment, wherever appropriate. Likewise, any advantage of any of the embodiments may apply to the other embodiments, and vice versa. Other objectives, features and advantages of the enclosed embodiments will be apparent from the following detailed disclosure, attached claims, and drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Particular embodiments are now described, by way of example, with reference to the accompanying drawings, in which.

DETAILED DESCRIPTION

Some of the embodiments contemplated by the claims will now be described more fully hereinafter with reference to the accompanying drawings. Other embodiments, however, are contained within the scope of the claims and the claims should not be construed as limited to only the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
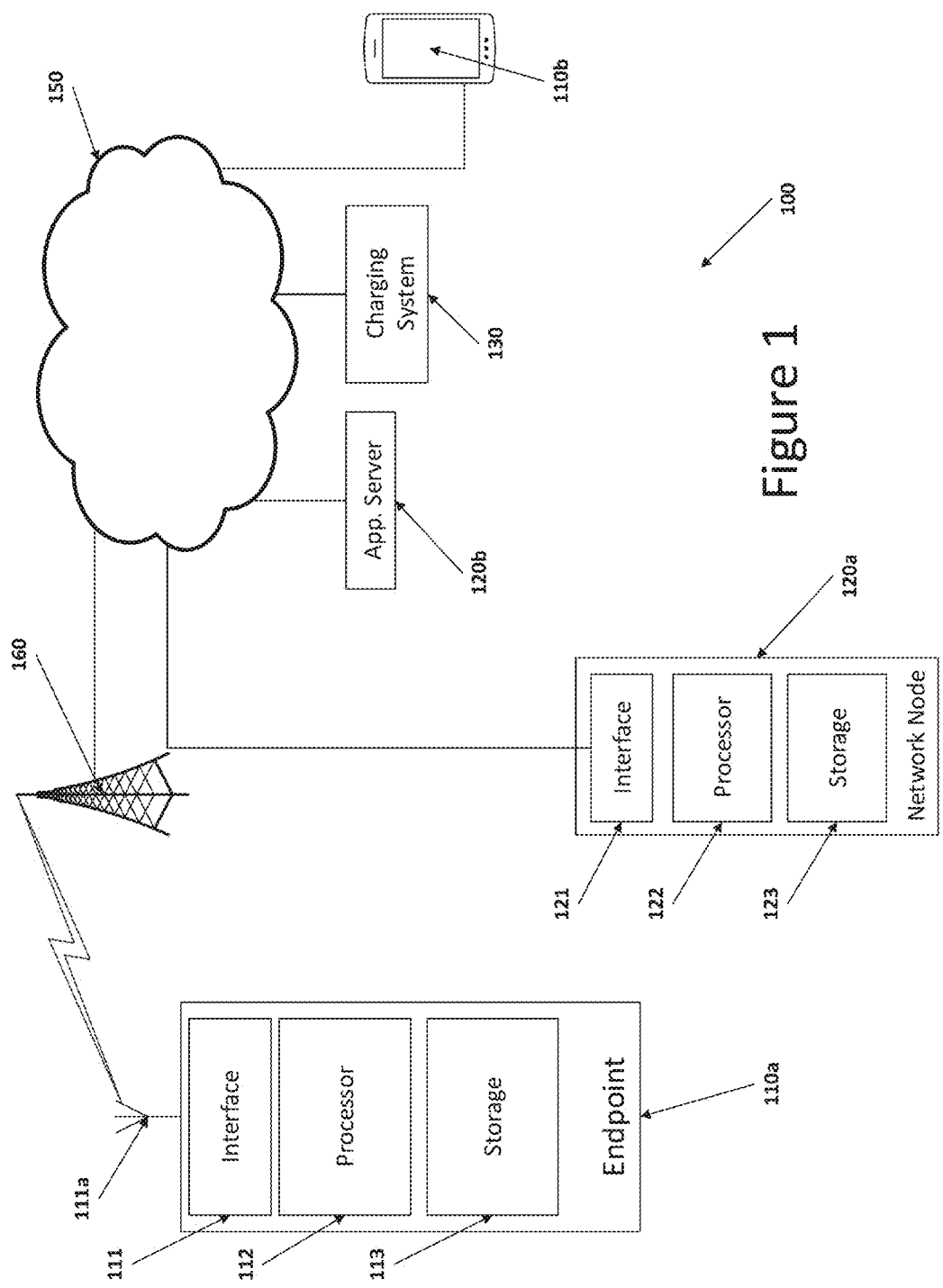
FIG. 1 is a communication network showing some of the components used in shifting charges according to particular embodiments.

FIG. 1 is a communication network showing some of the components used in shifting charges according to particular embodiments. As illustrated, communication network 100 includes, among other things, network nodes 120a and 120b and endpoints 110a and 110b, in accordance with a particular embodiment. For simplicity, only those components of communication network 100 which are relevant to this disclosure have been depicted. As will be apparent to one skilled in the art, in practice communication network 100 will comprise additional components not illustrated herein.

Communication network 100 may allow for the shifting of charges associated with a communication session. This may be useful in any of a number of scenarios in which one of the users does not want to be responsible for the charges incurred during a communication session. For example, when a user needs technical support for a product or service that the user has purchased, the purchasing user may not wish to pay for the technical support. In such a case, certain embodiments may allow the user that provided the product or service to be responsible for any charges that may be incurred by the purchasing user in connection with a communication session for technical support. As another example, a parent may want to be responsible for any charges incurred during a communication sessions with the parent's child. An additional example may be when a company wants to run a promotion and provide users with information about their products without the user having to use any of the data from their data plan. Another example may be with respect to public service announcements in which it may be desired to provide the public, or specific users, with instructional videos without the public, or specific users, being charged for receiving the public service announcement. Depending on the embodiment, the user that is going to be responsible for the charges of the other user may take responsibility for all the charges or some of the charges (e.g., only the media that the responsible user sends, or only video related media, etc.). This is achieved, in part, by providing a mechanism for the respective user's endpoint to send/receive messages/signalling to offer, accept, reject, and/or modify such shifts in the charges associated with a communication session.

Looking now at certain components of communication network 100, network node 120a comprises processor 122, storage 123, and interface 121. Similarly, endpoint 110a comprises processor 112, storage 113, interface 111 and antenna 111a. These components may work together, and with other components, in order to provide endpoints with the ability to send a charging preference that indicates an offer, or request, for a shift in the charges associated with one of the endpoints in a communication session. As used herein, the phrases charge shift, shifting charges, shift of the charges, and the like, refer to a change in the default allocation (e.g., each endpoint is responsible for the charges it incurs) of charges between the endpoints of a communication session. As a practical matter, the shift in charges results in the communication session being cheaper (or free) for one user and more expensive for the other user. The charges that are shifted may be the actual monetary costs, the minutes that used from a voice plan, the amount of data that is communicated, or any other mechanism through which a service provider monitors usage and/or costs of the services it provides. In different embodiments, the wireless network may comprise any number of wired or wireless networks, network nodes, application servers, base stations, controllers, endpoints, wireless devices, relay stations, and/or any other components that may facilitate or participate in the communication of data and/or signals whether via wired or wireless connections.

Network node 120a comprises processor 122, storage 123, interface 121, and antenna 201a. These components are depicted as single boxes located within a single larger box. In practice however, a network node may comprise multiple different physical components that make up a single illustrated component (e.g., storage 123 may comprise multiple flash memory modules as well as one or more magnetic disk drives or interface 121 may comprise different ports for different connection types). Similarly, network node 120a may be distributed across multiple devices composed of multiple physically separate components, which may each have their own respective processor, storage, and interface components. In certain scenarios in which network node 120a comprises multiple separate components, one or more of the separate components may be shared among several application servers. For example, a service provider may use a virtual application server, or the service provider may distribute the functions of an application server such that certain tasks are performed by a local application server and certain tasks are performed by a remote application server. In such a scenario, each combination of components that make a complete application server may be considered a single separate application server. In the depicted embodiment, network node 120a is an application server. Although the functionality is described in terms of an application server, as may be apparent to one skilled in the art, the functionality described and performed by network node 120a may be performed by any of a variety of different types of network nodes.

Processor 122 may be a combination of one or more of a microprocessor, controller, microcontroller, central processing unit, digital signal processor, application specific integrated circuit, field programmable gate array, or any other suitable computing device, resource, or combination of hardware and software and/or encoded logic operable to provide, either alone or in conjunction with other network node 120a components, such as storage 123, network node 120a functionality. For example, processor 122 may execute instructions stored in storage 123. Such functionality may include providing various applications and features provided by the service provider for its customers including those discussed herein. For example, one such feature may comprise providing network node 120a with the ability to interpret a request to shift at least some of the charges incurred by one of the endpoints during a communication session.

In certain embodiments, processor 122 may be used to determine whether to establish or reject a communication session between two endpoint nos. The determination may be based on a variety of different factors. For example, the processor may use information from charging system 130 regarding the account status of one, or both, of the endpoints. As another example, processor 122 may use information, such as charging preference information, included in a request for a communication session (e.g., who is requested to be responsible, what they are to be responsible for (e.g., media type, timing, duration, sender/recipient, etc.), etc.). As another example, processor 122 may determine whether a response from an endpoint indicates whether the proposed shift in charges was approved, rejected, or modified for the requested communication session. If the response does not include an accept or reject indication, processor 122 may determine that the second user's endpoint that sent the response did not recognize the charging preference in the request and may try sending the request a different way. For example, processor 122 may generate an audible message to be sent to the user asking the user to press a number on their endpoint to respond.

Storage 123 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 123 may store any suitable instructions, data or information, including software and encoded logic, utilized by network node 120a. In some embodiments, storage 123 may store one or more pre-recorded messages, or portions thereof (e.g., a portion of the message may be pre-recorded while another portion may be dynamically generated, such via text-to-speech technology based on the identity of the requesting endpoint and/or user), that may be played to a user being asked to be responsible for all or some of the charges incurred by another user during a communication session.

Network node 120a also comprises interface 121 which may be used in the wired or wireless communication of signalling and/or data between network node 120a, network 150, endpoint 110a, charging system 130, application server 120b, and/or any other components of communication network 100 (both depicted and not depicted). For example, interface 121 may perform any formatting, coding, or translating that may be needed to allow network node 120a to send and receive messages with endpoint 110a. Interface 121 may also include a radio transmitter and/or receiver. The radio may receive digital data that is to be sent out to other network nodes or endpoints via a wireless connection. As used herein, an interface may comprise any number of ports, connections, types, formats, and or protocols. For example, interface 121 may receive a first message on an optical line and transmit a second message on an Ethernet line.

In some embodiments, interface 121 may receive a request for a communication session between, for example, endpoint 110a and endpoint 110b. The request may include therein a charging preference. The charging preference may, as a practical matter, indicate that, for example, a user of endpoint 110a wants the user associated with endpoint 110b to be responsible for at least a portion of the charges incurred by endpoint 110a during the communication session. Interface 121 may also transmit a message to, and receive a response from, charging system 130, based on the charging preference, indicating that endpoint 110a has requested a shift in at least a portion of the charges incurred by endpoint 110a during the call. In certain scenarios, for example where endpoint 110b has requested that at least some of the charges incurred by endpoint 110b are shifted, interface 121 may transmit a query message to, and receive a response from, endpoint 110a. The query message may contain the charging preference and the response may indicate whether endpoint 110a accepts or rejects the requested shift in the charges incurred by endpoint 110b. Interface 121 may also be able to transmit a second message to endpoint 110a. For example, if the response from endpoint 110a does not include an indication as to whether the requested shift in charges is accepted or rejected, interface 121 may send a second message that contains an audible query (e.g., a pre-recorded message) directed at the user of endpoint 110a.

Endpoint no may be any type of wired or wireless endpoint, mobile station, mobile phone, wireless local loop phone, smartphone, user equipment, desktop computer, PDA, cell phone, tablet, laptop, VoIP phone or handset, which is able to send and receive data and/or signals to and from a network node, such as network node 120a and/or another endpoint such as endpoint 110b. Endpoint 110a comprises processor 112, storage 113, interface 111, and antenna 111a. Like network node 120a, the components of endpoint 110a are depicted as single boxes located within a single larger box, however in practice an endpoint may comprises multiple different physical components that make up a single illustrated component (e.g., storage 113 may comprise multiple discrete microchips, each microchip representing a portion of the total storage capacity).

Processor 112 may be a combination of one or more of a microprocessor, controller, microcontroller, central processing unit, digital signal processor, application specific integrated circuit, field programmable gate array, or any other suitable computing device, resource, or combination of hardware and software and/or encoded logic operable to provide, either alone or in combination with other endpoint no components, such as storage 113, endpoint 110a functionality. Such functionality may include providing various features discussed herein, including any of the steps or methods disclosed herein. For example, in some embodiments, processor 112 may facilitate in providing a user of endpoint 110a with an option to establish a communication session with endpoint 110b in which endpoint 110b is responsible for the charges incurred by endpoint 110a. Such an indication may comprise preparing an indication for display on a display screen of endpoint 110a. Similarly, if endpoint 110a is being asked to be responsible for the charges of another user, processor 112 may provide the user of endpoint 110a with a way to accept or reject the requested communication session (e.g., generate an accept and a reject icon on a display screen of endpoint 110a). Processor 112 may further be configured to take input from a user and translate the input into a request that is sent via interface 111.

Storage 113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by endpoint 110a.

Interface 111 may be used in the wireless communication of signalling and/or data between endpoint 110 and network node 120a. For example, interface 111 may perform any formatting, coding, or translating that may be needed to allow endpoint 110 to send and receive data from network node 120a over a wireless connection. Interface 111 may also include a radio transmitter and/or receiver that may be coupled to or a part of antenna 111a. The radio may receive digital data that is to be sent out to network node 201 via a wireless connection. The radio may convert the digital data into a radio signal having the appropriate channel and bandwidth parameters. The radio signal may then be transmitted via antenna 111a to base station 160.

Antenna 111a may be any type of antenna capable of transmitting and receiving data and/or signals wirelessly. In some embodiments, antenna 111a may comprise one or more omni-directional, sector or panel antennas operable to transmit/receive radio signals between 2 GHz and 66 GHz.

For simplicity, antenna 111a may be considered a part of interface 111 to the extent that a wireless signal is being used.

Network 120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Figure 2:
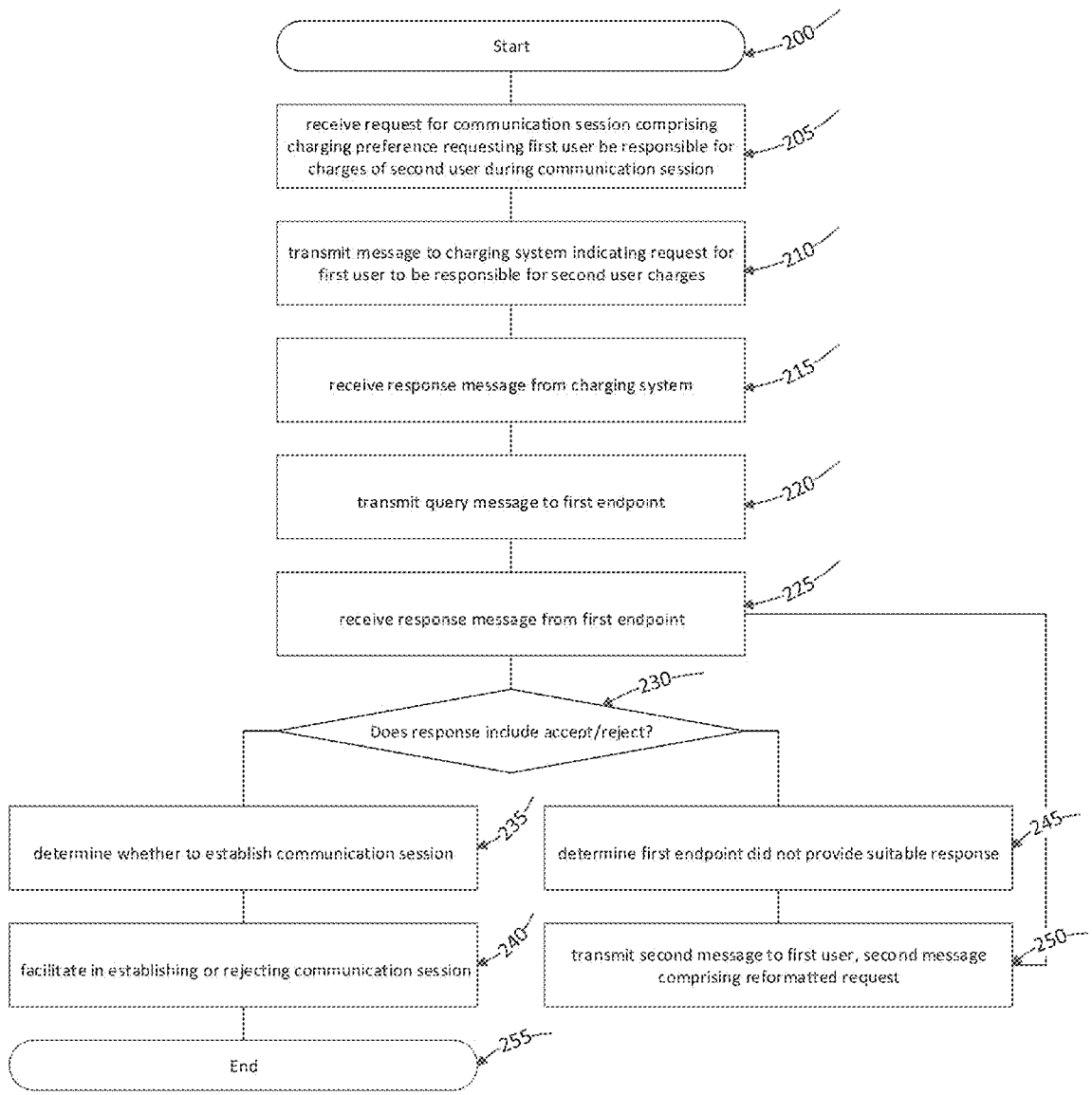
FIG. 2 is a flowchart showing a method for shifting charges according to particular embodiments.

FIG. 2 is a flowchart showing a method for shifting charges according to particular embodiments. The flowchart is from the perspective of a network node, such as network node 120a. The method starts at step 200. Then at step 205 a request for a communication session between at least two endpoints is received (e.g., via interface 121). The requested communication session may be a new communication session or it may be an extension of, or addition to, an existing communication session (e.g., the users initially are involved in a voice call and then one wants to add video).

The request includes a charging preference that indicates a request for a shift of at least a portion of the charges incurred by a second endpoint during the requested communication session (this would be in addition to the standard charges incurred by the first endpoint). In some embodiments, the charging preference may comprise an indication of at least one media type for which the charges are to be shifted. For example, if the charging preference indicated video, only the video related charges of the communication session (and not any other charges such as voice or file transfers) would be shifted. The charging preference may be included in a header. For example, the charging preference may be included in a SIP header. Depending on the scenario, the request may be sent from either the first or the second endpoint. Depending on the scenario, the first endpoint may be the "caller" or the "called." In those instances where the charging preference indicates that only a portion of the charges incurred by the second endpoint are going to be shifted, the charging preference may also indicate what portion is being shifted. For example, it could indicate that all charges associated with a particular media type (e.g., video) are shifted. As another example, it could indicate that certain types of charges (e.g., data charges) are shifted. As yet another example, it could indicate temporal restrictions on the charges that are shifted (e.g., only charges incurred by the second endpoint after receipt of the acceptance message, or only charges for the first five minutes of the communication session, etc.).

At step 210 a message is transmitted to a charging system (e.g., via interface 121). The message is based on the request received at step 205 comprising the charging preference. Depending on the scenario, this message may simply be to inform the charging system that at least some of the charges incurred by the second endpoint during the communication session are being shifted. In some scenarios, the message may function as a request to the charging system that queries whether or not the first user associated with the first endpoint is authorized, or has the funds available, to take on the charges incurred by both of the endpoints during the communication session.

At step 215 a response message is received from the charging system (e.g., via interface 121). In some embodiments, the response message may simply be an acknowledgement that the charging system received the message from the network node (e.g., where the charging system is associated with a first endpoint and the charges are requested to be shifted to a second endpoint). In certain embodiments, the response message may indicate whether or not the charges incurred by the second endpoint during the communication session can be shifted.

At step 220 a query message is transmitted to the first endpoint (e.g., via interface 121). The query message may include the charging preference received in the request of step 205. The query message, once received by the first endpoint, may be processed and presented to a user of the first endpoint to ask the user whether or not he agrees to be responsible for the charges incurred by the second user, in addition to his own charges. In some embodiments, no query message may be sent. For example, the first user may be providing technical support for his customers and has previously agreed that he will be responsible for any charges incurred by any user attempting to contact him. For example, the first user may provide his customers with a unique phone number, URL, program, or application through which the customers are able to contact him without having to be responsible for any of the associated charges. Depending on the embodiment and/or scenario, the first endpoint may alert the user of the charging preference and/or the associated request to shift the charges in a variety of different formats. For example, if the first endpoint includes a touch screen, the first endpoint may present the first user with information about the requested shift in charges as well as the ability to accept, reject, or modify the shift on the screen of the first endpoint. As another example, the first endpoint may play an audible message that prompts the user to select an appropriately numbered button on the phone to accept, reject, or modify the requested shift in charges.

At step 225 a response message is received from the first endpoint (e.g., via interface 121). The response message may include an indication that the first endpoint accepts the request, rejects the request, or in some embodiments makes a counter-request (e.g., a change in the type or amount of charges that will be shifted). At step 230, the network node determines whether the response message from the first endpoint includes an indication that the first endpoint accepts or rejects the request to shift at least some of the charges incurred by the second endpoint (e.g., via processor 122). Depending on whether the response includes an explicit indication as to whether the first endpoint accepts or rejects the request to shift at least some of the charges, the method proceeds to either step 235 or step 245. In some embodiments, upon receipt of the response message, the network node may verify that the response message's Accept-tag is set with respect to the charging preference.

If the response message received from the first endpoint does not include an accept/reject indication with respect to shifting the charges, the method proceeds to step 245 where the network node determines that the first endpoint did not provide a suitable response to the charging preference in the query message sent at step 220 (e.g., via processor 122). This may occur where, for example, the hardware or software of the first endpoint does not recognize the charging preference as a request to shift the charges. This may also occur where, for example, the hardware or software of the first endpoint is incapable of generating a response to the query message that includes an accept/reject indication. This may also occur where, for some reason, the user of the first endpoint does not make a selection (e.g., the user is driving and cannot access the first endpoint). In some embodiments, if the response message indicates that the communication session is accepted but the Accept-tag with respect to the charging preference was not set, then the network node may send a message to the second endpoint indicating that the requested shift in charges was not confirmed by the first endpoint. This function may help to provide a deterministic service behaviour even if both the endpoints do not have support for the Charging-Preferences header.

At step 250 a second message is transmitted to the first endpoint (e.g., via interface 121). The second message may be a reformatted request to shift at least a portion of the charges incurred by the second user. The second message and the query message may comprise different formats. For example, where the query message may have comprised a charging preference in the header, the second message may comprise an audible message for the first endpoint to play for the first user. As another example, the second message may comprise a textual message (e.g., an SMS message, a notification, an e-mail message, etc.) that is sent to the first endpoint. The user of the first endpoint may then provide an indication via the solicited input means (e.g., selecting the appropriate digit from a number pad, providing the appropriate audible response, etc.). Depending on the embodiment, the first endpoint may provide a response to the second message in a similar format as the second message (e.g., an audible response). With the receipt of the response, the method returns to step 225.

At step 235, the network node determines whether to establish the communication session between the two endpoints or to reject the communication session between the two endpoints (e.g., via processor 122). The determination may be based on a variety of factors. For example, the network node may determine to reject the communication session if the charging system's response at step 215 is a rejection message based on the first user not having sufficient funds to cover the expected charges incurred by both users. As another example, the network node may determine to reject the communication session if the first endpoint rejects the request to be responsible for the charges of the second endpoint.

At step 240, the network node facilitates in establishing or rejecting the requested communication session based, at least in part, on the determination made at step 235 (e.g., via interface 121 and processor 122). The steps and processes involved may vary depending on the type of communication session requested and the protocols used. In some embodiments, the information included in the SIP signalling may also be sent to the charging system for post processing to do the settlement between service providers.

The steps described above are merely illustrative of certain embodiments. It is not required that all embodiments incorporate all the steps above nor that the steps be performed in the exact order depicted in FIG. 2. For example, in some embodiments, the network node may wait until it receives a response from the first user before it transmits a message to the charging system. Furthermore, some embodiments may include steps not illustrated in FIG. 2. For example, in some embodiments, the first user of the first endpoint may have agreed ahead of time that he would be responsible for both users' charges for any communication sessions he initiates. In which case, step 220 (transmitting query message to first endpoint) may be skipped. As another example, the first endpoint may accept a shift of some, but not all, of the charges that were initially requested (e.g., the request was to shift all charges, but response from first endpoint only accepted a shift in data related charges—not audio/voice related charges). As such, the method may include additional steps related to notifying the second endpoint of the change and receiving a response as to whether the second endpoint wishes to proceed under the new conditions.

The steps illustrated in FIG. 2, and described above, may be performed through a computer program product that may, for example, be executed by the components and equipment illustrated in FIG. 1. For example, storage 123 may comprise computer readable means on which a computer program can be stored. The computer program may include instructions which cause processor 122 (and any operatively coupled entities and devices, such as interface 121 and storage 123) to execute methods according to embodiments described herein. The computer program and/or computer program product may thus provide means for performing any steps herein disclosed.

The signalling diagrams depicted in FIGS. 3 through 7 will now be described. While the diagrams will focus on a video call, one skilled in the art would recognize that features can be adapted to, or applied to, different services, such as file transfers.

Figure 3:
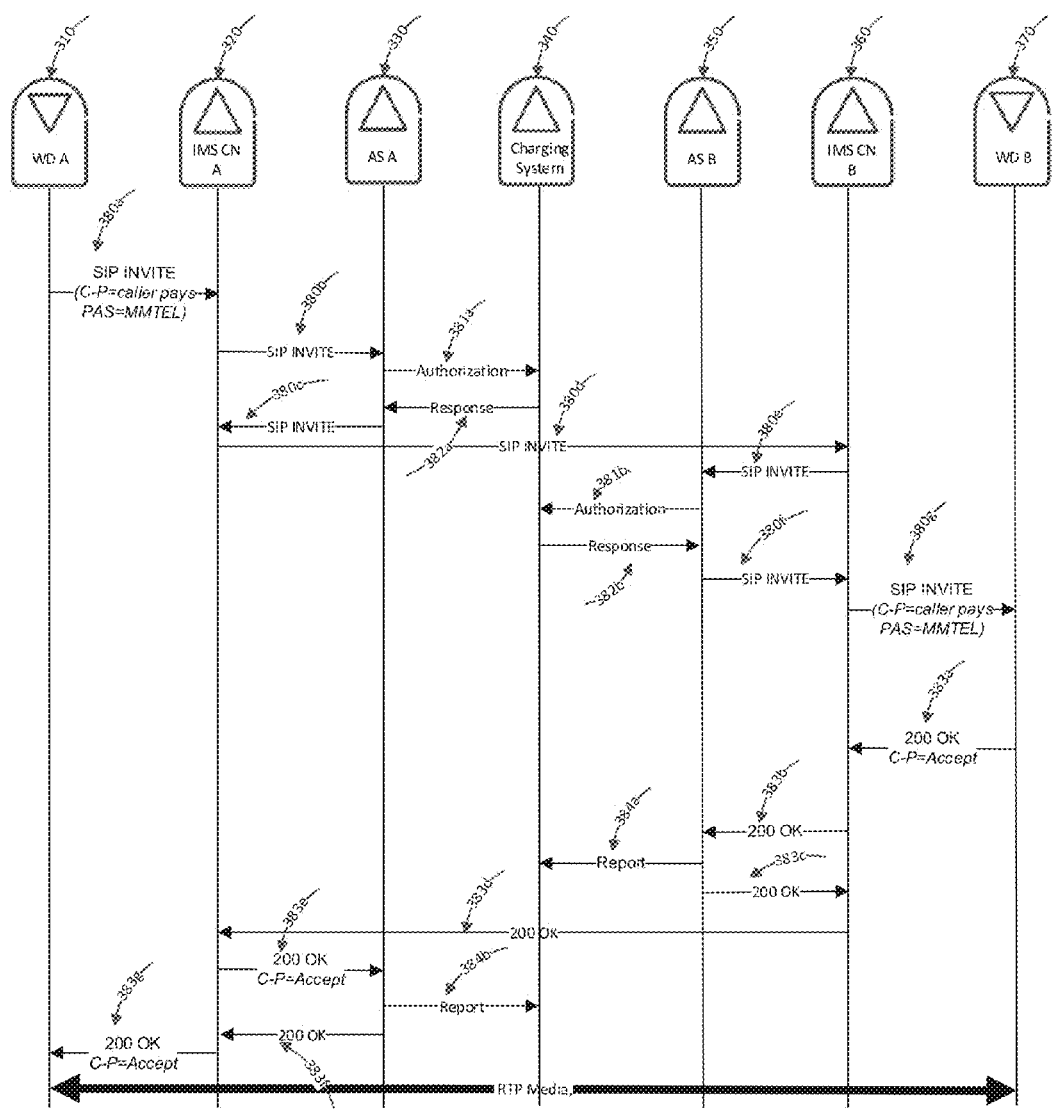
FIG. 3 is a signalling diagram for a new communication session in which an initiating endpoint is offering to shift the charges of the terminating endpoint in accordance with particular embodiments.

FIG. 3 is a signalling diagram for a new communication session in which an initiating endpoint is offering to shift the charges of the terminating endpoint in accordance with particular embodiments. In FIG. 3, initiating endpoint WD A 310, the calling party, wants to start a video call with terminating endpoint WD B 370, the called party. WD A 310 initiates the video call (a type of communication session) by sending SIP invite 380a to IP Multimedia Subsystem Core Network (IMS CN) A 320 indicating that, if accepted, the data charges for WD B 370 associated with the video will be shifted to an account associated with the user of WD A 310. This indication may be provided in a unique field in the SIP header created specifically for this purpose. The unique field is referred to herein as "Charging-Preference" or (C-P). When initiating a new communication session or when adding new media to an established communication session the initiator may include the C-P in the header of the request for the new communication session. The C-P may specify to which media the requested shift in charges refers (e.g., audio, video, messages, data, any, all, etc.). The C-P may also specify where (or from where) the charges are to be shifted. In this figure, the C-P is used in order for WD A 310 to signal to WD B 370 that the user of WD A 310 is offering to accept a shift in the charges incurred by WD B 370 during the video call. In some embodiments, the C-P indication in the SIP header may be carried end to end via SIP invites 380a through 380g.

WD A 310 may generate the C-P in a variety of different manners. For example, in some embodiments, the user of WD A 310 may use a Feature Access Code (FAC) prior to initiating the call with WD B 370. By entering the appropriate FAC, the user is able to indicate to WD A 310 that the user wants WD A 310 to include a C-P that offers to have the charges shifted to the user of WD A 310. As another example, WD A 310 may provide the user with either a soft button (e.g., provided via a user interface) or a hard button (e.g., a dedicated button), generally referred to herein as simply a button. The button may be used by the user to indicate that the user is requesting to be responsible for the shifted charges (or if replying to an incoming request, accept, reject or modify the shift in charges).

Once SIP Invite 380b reaches the Application Server (AS) AS A 330, AS A 330 sends authorization message 381 to charging system 340 to ascertain whether the account associated with WD A 310 is authorized to accept the shifted charges.

After checking the account of WD A 310, charging system 340 sends response 382 indicating whether the WD A 310 can accept the shifted charges. If the answer is no, then AS A 330 may send a reject message back towards WD A 310 via IMS CN A 320. For purposes of this signalling diagram, it is assumed that WD A 310 is approved. Accordingly, once AS A 330 receives response 382, it sends SIP Invite 380c to IMS CN A 320. IMS CN A 320 then sends SIP Invite 380d to IMS CN B 360.

IMS CN B 360 sends SIP invite 380e to AS B 350 and then a similar authorization 381b and response 382b exchange occurs between AS B 350 and charging system 340. In the depicted embodiment, both WD A 310 and WD B 370 use the same operator and so only a single charging system 340 is depicted. In some embodiments, the single charging system may simply adapt the respective accounts of the two users based on the shift in charges. However, in practice it may be that the calling party and the called party get their respective service from different service providers. In such a scenario, part of the authorization may involve the charging systems from each operator communicating with one another. For example, there may need to be a charging agreement in place for how the charges will be handled once shifted. For example, they may agree on charging 2 times the cost of the call to the party willing to pay.

Once SIP Invite 380g reaches WD B 370 it may depend on the capabilities of WD B 370, or the scenario, as to whether or not the user of WD B 370 is aware that the caller, WD A 310, is offering to have the charges incurred by WD B 370 during the communication session shifted. In some embodiments, WD B 370 may be able to provide an indication on a user interface that WD A 310 has offered to have the charges (or at least a portion of the charges) for the communication session shifted to the account of WD A 310. For example, WD B 370 may generate for display to the user an indication of who will pay for the incoming video. In certain scenarios, even where WD B 370 does not have a user interface capable of providing the indication, the user may still be alerted to the fact that WD A 310 has offered to accept the shifted charges. For example, the user of WD B 310 may have an agreement with his service provider that only calls in which the caller is going to be responsible are to be sent to WD B 370 or such calls are to have a unique ring tone or other alert mechanism (e.g., where a parent has provided their child with a phone).

In the depicted embodiment, the user has agreed to accept the call. WD B 370 then sends a 200 OK message 383a that includes a C-P Accept indication in the header. In some embodiments, if the proposed shift in charges is accepted, then WD B 370 may accept the session or media and acknowledge the proposed charging preference by setting an Accept-tag in the Charging-Preferences header in the response. This indicates that WD B 370 not only accepts the incoming call but agrees that the charges will be shifted to the account associated with WD A 310. The 200 OK messages 383a-383b, along with the C-P Accept, are then propagated back to the various components until it finally reaches WD A 310 and the video call can start. Along the way, once OK message 383b reaches AS B 350, AS B 350 will send report 384a to charging system 340. Similarly, once 200 OK 383e reaches AS A 330, AS 330 will send report 384b to charging system 340. This will alert charging system 340 that WD A 310 and WD B 370 have agreed to shift the charges incurred by WD B 370 to WD A 310 for the video call.

Figure 4:
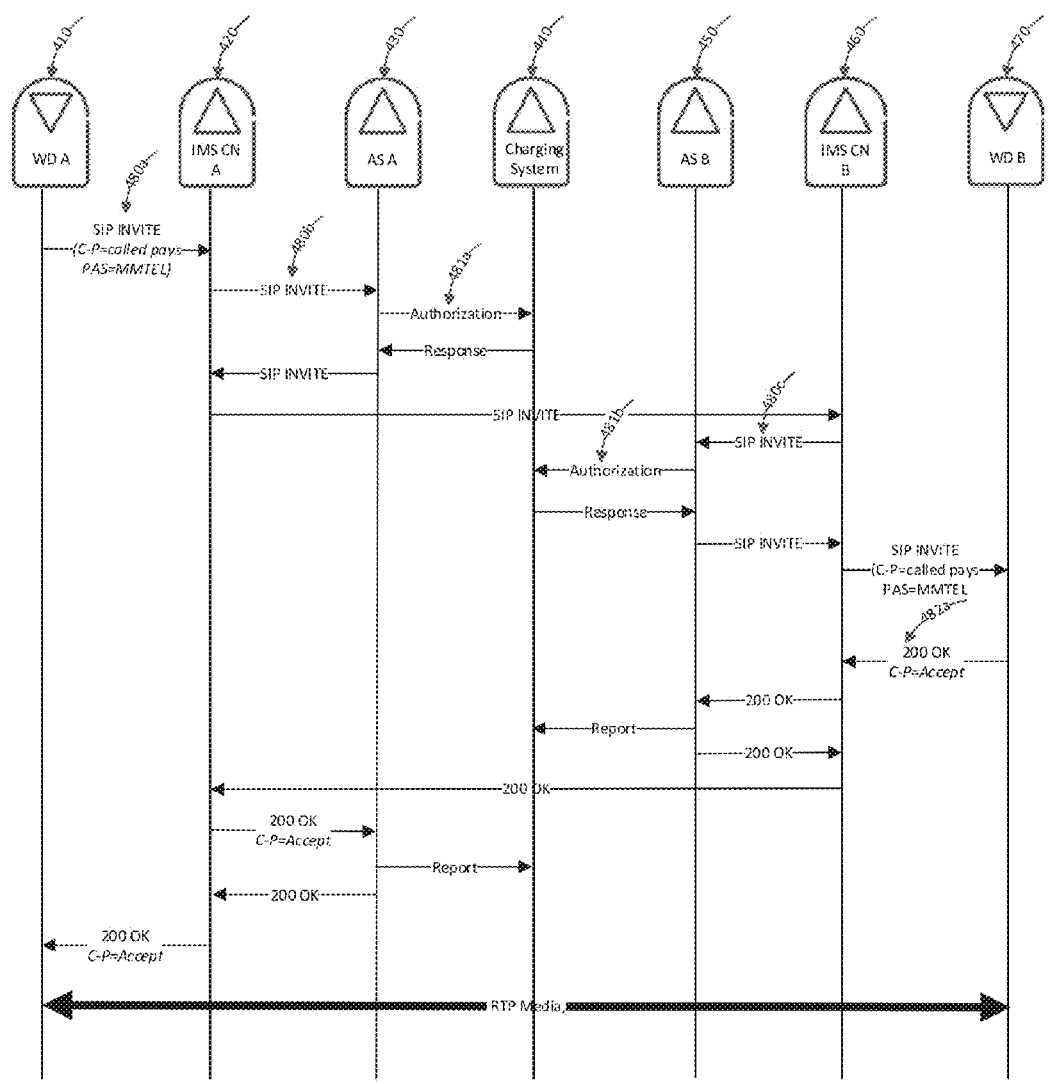
FIG. 4 is a signalling diagram for a new communication session in which an initiating endpoint is requesting that the charges associated therewith be shifted, in accordance with particular embodiments.

FIG. 4 is a signalling diagram for a new communication session in which an initiating endpoint is requesting that the charges associated therewith be shifted, in accordance with particular embodiments. In this signalling diagram, WD A 410 requests a new communication session that comprises a video call in which at least a portion of the charges incurred by WD A 410 during the video call will be shifted. Many of the signals depicted in FIG. 4 are similar to those in FIG. 3. For purposes of simplicity, the description of FIG. 4 will focus on the differences.

The SIP invite 480a that is sent by WD A 410 includes in the header a C-P indicating that WD A 410 is requesting that the charges incurred by WD A 410 during the call be shifted to an account associated with WD B 470. When SIP invite 480b reaches AS A 430, it sends authorization 481a to charging system 440. However, this time, since WD A 410 is requesting to not be responsible for the charges, charging system 440 is not as much concerned with the funds or account of WD A 410. Rather, charging system 440 is concerned with whether there is an agreement in place with the service provider for WD B 470 such that charges can be shifted. The message may also, where possible, alert charging system 440 of the proposed shift in charges. In some embodiments, charging system 440 may also check whether WD B 470's account has the funds and permissions to accept the charges. In the scenario depicted in FIG. 4, WD A 410 and WD B 470 share the same service provider. This makes it an easy process to shift the charges.

Once SIP invite 480c reaches AS B 450, it sends authorization 481b to charging system 440. Here, charging system 440 will ensure that WD B 470 has the funds and the proper permissions to accept the shifted charges. Once WD B 470 sends 200 OK 482a accepting the shift in charges, the signalling proceeds similarly to the signalling depicted in FIG. 3.

Figure 5:
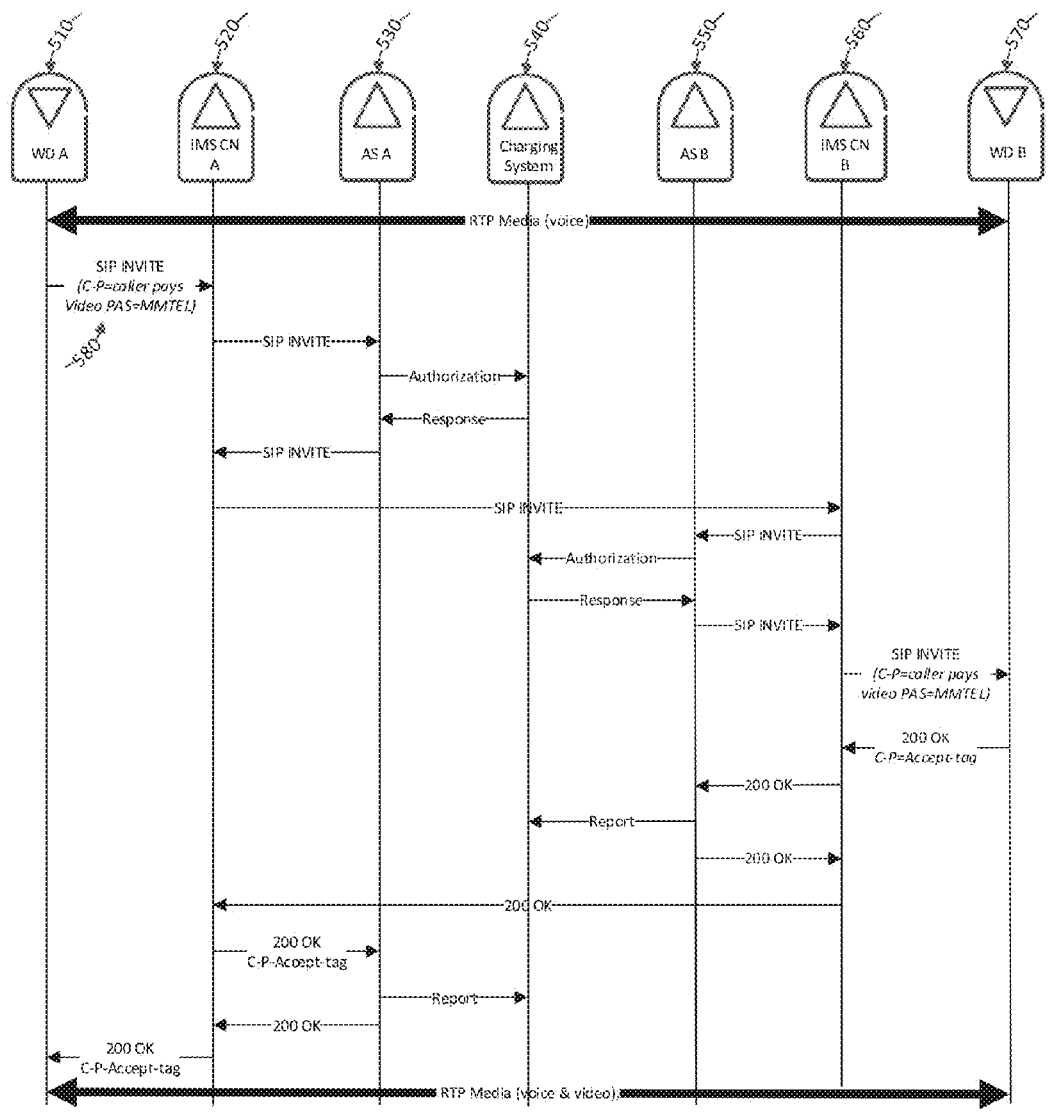
FIG. 5 is a signalling diagram for an additional communication session in which an initiating endpoint is offering to shift the charges of the terminating endpoint in accordance with particular embodiments.

FIG. 5 is a signalling diagram for an additional communication session in which an initiating endpoint is offering to shift the charges of the terminating endpoint in accordance with particular embodiments. The additional communication session may be requested when, for example, WD A 510 and WD B 570 are involved in a voice call and WD A 510 has requested that video be added to the call without WD B 510 incurring any charges associated with the newly added video. For example, where WD A 510 is providing technical support, and during the voice call decides that it would be helpful to show WD B 570 something through video or provide WD B 570 with some documentation via a file transfer. The signals passed are similar to those in FIG. 3. The main difference is that there is already a communication session in progress when SIP Invite 580 is sent.

Figure 6:
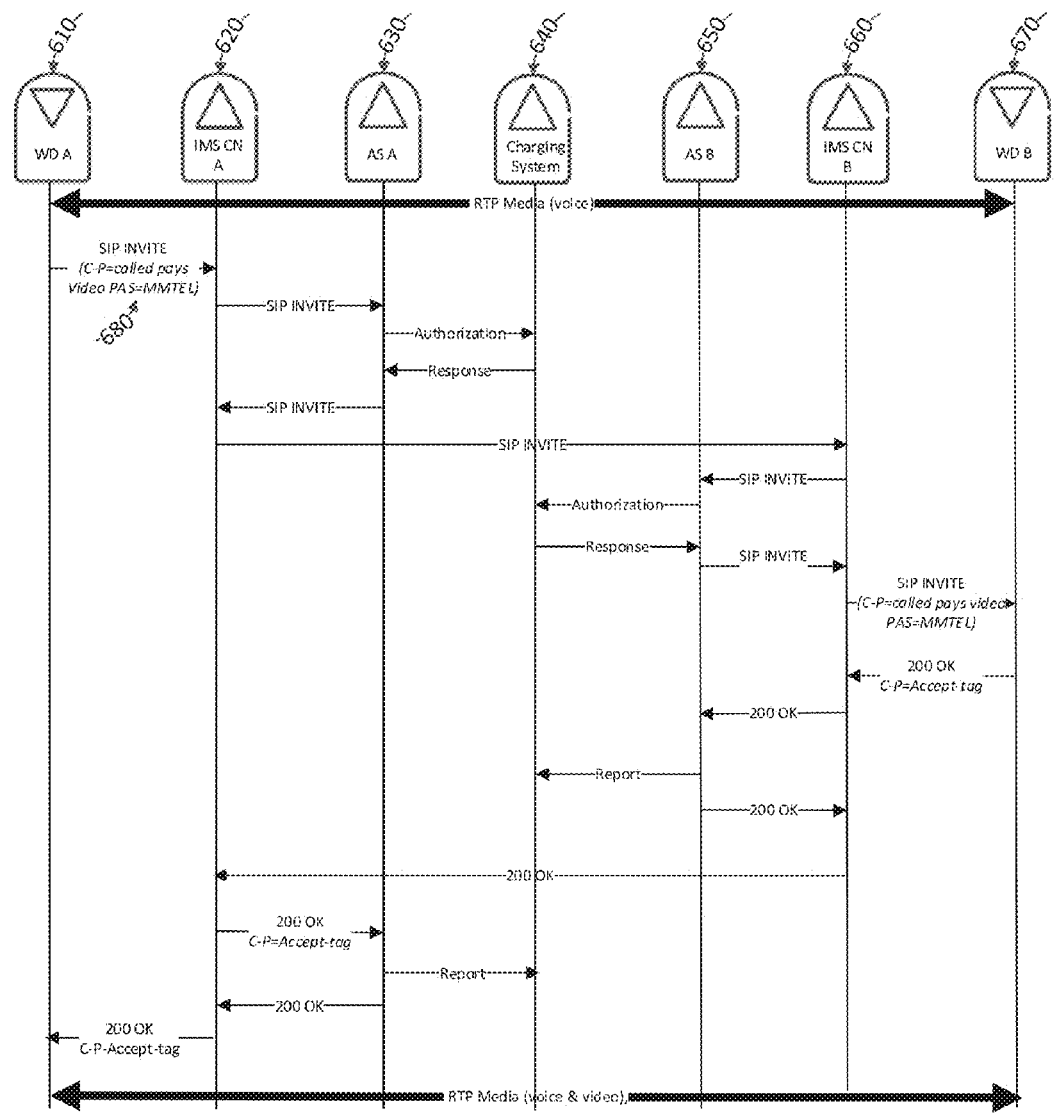
FIG. 6 is a signalling diagram for an additional communication session in which an initiating endpoint is requesting that the charges associated therewith be shifted, in accordance with particular embodiments.

FIG. 6 is a signalling diagram for an additional communication session in which an initiating endpoint is requesting that the charges associated therewith be shifted, in accordance with particular embodiments. The additional communication session may be requested when, for example, WD A 610 and WD B 670 are involved in a voice call and WD B 670 has requested to have video added to the call without WD A 610 incurring any charges associated with the newly added video. The signals passed are similar to those in FIG. 4. The main difference is that there is already a communication session in progress when SIP Invite 680 is sent.

Figure 7:
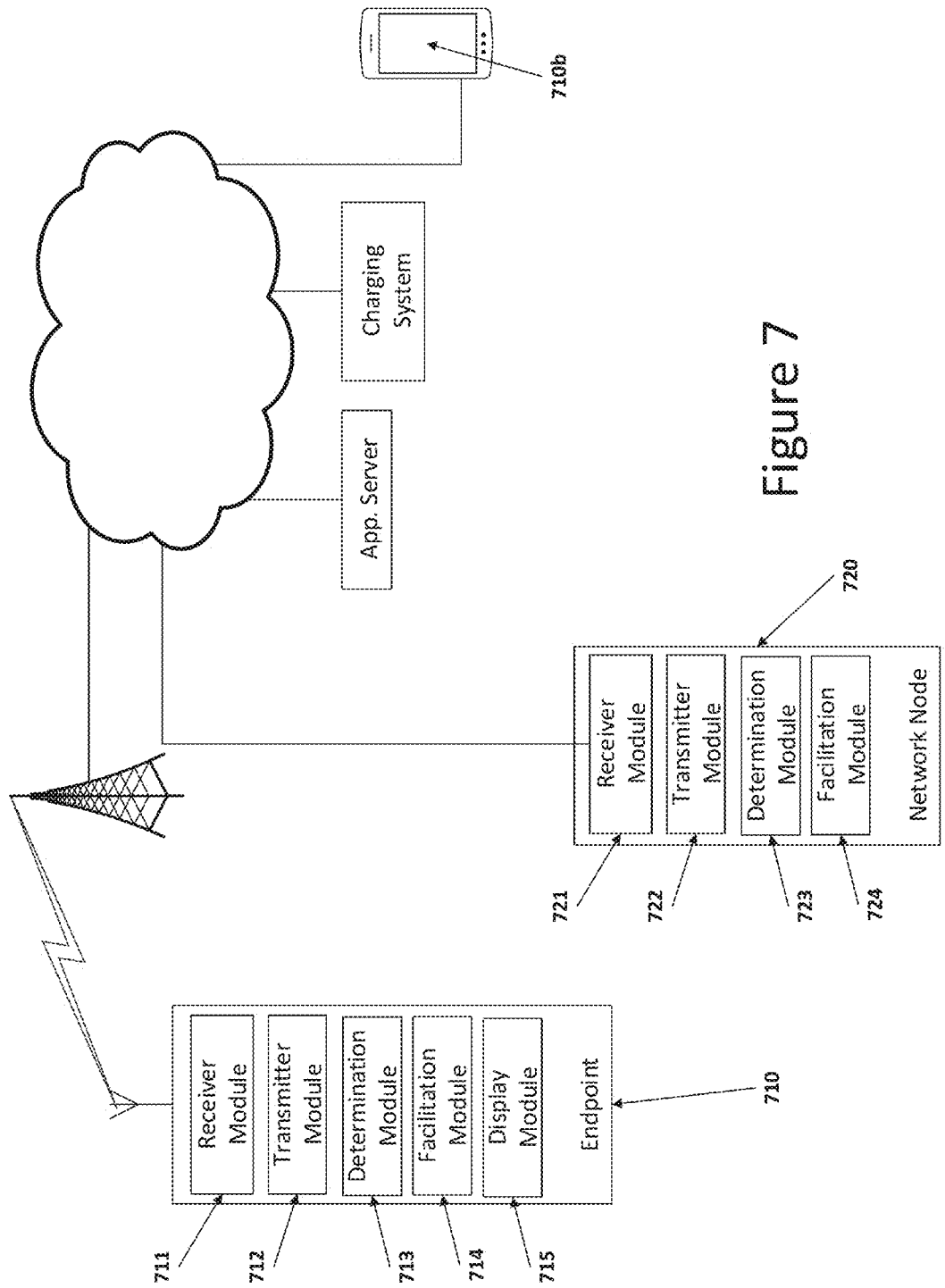
FIG. 7 schematically illustrates, in terms of a number of functional modules, the components of an endpoint and a network node configured to shift charges, in accordance with particular embodiments.

FIG. 7 schematically illustrates, in terms of a number of functional modules, the components of an endpoint and a network node configured to shift charges, according to particular embodiments. In general terms, each functional module depicted therein may be implemented in hardware and/or in software. Preferably, one or more or all functional modules may be implemented by processors 112 and/or 122, possibly in cooperation with storage 113 and/or 123. Processors 112 and/or 122 and storage 113 and/or 123 may thus be arranged to allow processors 112 and/or 122 to fetch instructions from storage 113 and/or 123 and execute the fetched instructions to allow the respective functional module to perform any steps or functions disclosed herein. In particular, there is depicted the functional modules of endpoint 710 and network node 720. Other embodiments may include more, fewer, or different functional modules. Moreover, a single depicted module may represent multiple similar modules. The modules may comprise software, computer programs, sub-routines, libraries, source code, or any other form of executable instructions that are run by, for example, a processor. In this FIG. 7, endpoint 710 comprises receiver module 711, transmitter module 712, determination module 713, facilitation module 714, and display module 715 and network node 720 comprises receiver module 721, transmitter module 722, determination module 723 and facilitation module 724.

Looking at network node 720 in more detail, receiver module 721 is configured to receive a request for a communication session between at least two endpoints. The request may be received from endpoint 710 or endpoint 710b. The request may comprise a charging preference indicating a request that at least a portion of the charges incurred by endpoint 710b during the communication session be shifted. The charging preference may further request that only charges with respect to a particular media type (e.g., video, data, voice, etc.) be shifted. Receiver module 721 is also configured to receive a response message from the charging system. The response message may approve or reject the requested shift in charges. The approval or rejection may be based on a variety of factors, such as: the permissions or features associated with either endpoint's account; the amount of funds in the account associated with the endpoint to which charges are being shifted; and/or what agreements are in place between each endpoint's respective service provider. Receiver module 721 may also be configured to receive a response message from endpoint 710. The response message may provide an indication of whether endpoint 710 agrees to be responsible for at least a portion of the charges incurred by endpoint 710b during the communication system. In some embodiments, receiver module 721 may be configured to receive an initial response message from endpoint 710. The initial response message may accept the request for a communication session but may fail to provide an indication of whether or not a shift in at least a portion of the charges incurred by endpoint 710b during the communication session is accepted.

Application server 720 also includes transmitter module 722. Transmitter module 722 may be configured to transmit a message to a charging system indicative of the request comprising the charging preference. In certain embodiments, transmitter module 722 may be configured to transmit a query message comprising the charging preference to the first endpoint. In some embodiments, transmitter module 722 may be configured to transmit a second message to endpoint 710 asking for approval to shift the charges. The second message may be sent when the initial response accepts the communication session but does not include a response to the C-P. The second message may comprise a reformatted request. For example, the second message may be reformatted into a form that the user of endpoint 710 is able to understand (e.g., an audible message).

Application server 720 further includes determination module 723. Determination module 723 is configured to determine whether to establish the communication session between the at least two endpoints or to reject the communication session between the at least two endpoints. In some embodiments, determination module 723 may be configured to determine whether to establish or reject a communication session based on a response message from the charging system. In certain embodiments, determination module 723 may be configured to determine whether to establish or reject a communication session based on a response from endpoint 710. In particular embodiments, determination module 723 is configured to determine from the initial response that the first endpoint did not provide a suitable response to the query message (e.g., it did not include an acknowledgement, acceptance, rejection, and/or modification of the C-P).

Application server 720 additionally includes facilitation module 724. Facilitation module 724 is configured to facilitate in the establishment of the communication session or the rejection of the communication session based on the determination.

Looking at endpoint 710, receiver module 711 may be configured to receive a request for a communication session for which charges incurred by one of the endpoints are to be shifted to the other endpoint. The request may include a charging preference that specifies to which endpoint the charges are to be shifted and what charges are to be shifted. Receiver module 711 may also be configured to receive an acknowledgement, an acceptance, a rejection and/or a modification of a transmitted request to shift at least some of the charges associated with a communication session.

Transmitter module 712 may be configured to generate a request for a communication session in which the charges incurred by one of the endpoints are to be shifted. The request may include a charging preference that specifies to which endpoint the charges are to be shifted and what charges are to be shifted.

Determination module 713 may be configured to determine, from the request received by receiver module 711, what has been requested of endpoint 710. Determination module 713 may further be configured to present information about the request to a user of endpoint 710. For example, if endpoint 710b has requested a communication session in which video related charges are to be shifted to endpoint 710b, determination module 713 may determine that a message stating "Endpoint 710b has offered to cover any video related charges for this Incoming Call. Would you like to answer it?" could be displayed on a user interface of endpoint 710. Determination module 713 may also be configured to determine, from input from a user of endpoint 710, what type of response message should be sent by transmitter module 712.

Facilitation module 714 is configured to facilitate in the establishment of the communication session or the rejection of the communication session based on the determination made by determination module 713.

Display module 715 may be configured to present, or display, information about a requested shift in charges. For example, on an incoming request for a communication session, display module 715 may generate a message to alert the user that the incoming communication session is from endpoint 710b and that endpoint 710b has offered to shift at least a portion of the charges incurred by endpoint 710. Display module 714 may also be configured to present, or display information about requesting a shift in charges. For example, display module 715 may generate an icon next to a contact listing which allows the user to place a call to the selected contact and request that the charges be shifted to the selected contact (or similarly offer to have the charges of the selected contact be shifted to the user making the call). Display module 715 may also provide the user with one or more buttons. Depending on the scenario, the buttons may be used to accept, reject, or modify an incoming request for shifting charges; or it may be used to generate a request to have the charges shifted.

Although certain functions have been described above with respect to FIG. 7, the illustrated modules may further be configured to perform other functions or steps not explicitly described with respect to the respective module, including providing any features or functions disclosed with respect to any of the other figures.

In view of the above disclosure, at least some of the herein disclosed embodiments may be summarized as providing methods, endpoints, and network nodes that allow for charges for a communication session to be shifted. Certain aspects of the inventive concept have mainly been described above with reference to a few embodiments. However, as is readily appreciated by a person skilled in the art, embodiments other than the ones disclosed above are equally possible and within the scope of the inventive concept, as defined by the appended claims. For example, with respect to the signalling diagram of FIG. 4, if a user had created a unique point of contact associated with WD 470 B that was for "free" technical support, AS B 450 or IMS CN B 460 may approve a request to shift charges without waiting for a response from WD B 470. Similarly, while a number of different combinations of components and/or modules have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method for shifting charges comprising:
receiving, from a first endpoint, a request for a communication session with at least a second endpoint;
during the communication session, receiving from the second endpoint a message comprising a request to modify a media type associated with the communication session, the message comprising a charging preference indicating a request for a shift in at least a portion of the charges associated with the communication session, wherein the requested shift in at least a portion of the charges is based on the requested modification of the media type associated with the communication session;
transmitting a message to a charging system indicative of the request for the shift in the charges based on the charging preference;
determining whether to accept the request to modify the communication session between the at least two endpoints or to reject the request to modify the communication session between the at least two endpoints; and
based on the determination, facilitating in the modification of the communication session or maintaining without modification the communication session.

2. The method of claim 1, further comprising:
receiving a response message from the charging system; and
wherein determining whether to accept or reject the request to modify the communication session is based on the response message from the charging system.

3. The method of claim 1, further comprising receiving a response message from a first endpoint, the response message comprising an indication of whether the requested shift in charges is accepted or rejected.

4. The method of claim 1, further comprising:
transmitting a query message comprising the charging preference to a first endpoint;
receiving an initial response message from the first endpoint, the initial response message does not provide an indication of whether the requested shift in charges is accepted or rejected;
determining from the initial response message that the first endpoint did not provide a suitable response to the query message; and
transmitting a second message to the first endpoint, the second message comprising a reformatted request, the reformatted request indicative of the requested shift in charges and comprising a format different than the query message.

5. The method of claim 1, wherein the first and second endpoints are currently in an established voiced communication session with one another and the requested modification of the media type associated with the communication session comprises adding video to the communication session.

6. A network node for shifting charges comprising:
an interface configured to:
receive, from a first endpoint, a request for a communication session with at least a second endpoint;
during the communication session, receive from the second endpoint a message comprising a request to modify a media type associated with the communication session, the message comprising a charging preference indicating a request for a shift in at least a portion of the charges associated with the communication session, wherein the requested shift in at least a portion of the charges is based on the requested modification of the media type associated with the communication session; and
transmit a message to a charging system indicative of the request for the shift in charges based on the charging preference; and
a processor coupled to the interface and configured to:
determine whether to accept the request to modify the communication session between the at least two endpoints or to reject the request to modify the communication session between the at least two endpoints; and
based on the determination, facilitate in the modification of the communication session or maintaining without modification the communication session.

7. The network node of claim 6, wherein:
the interface is further configured to receive a response message from the charging system; and
the processor is further configured to determine whether to accept or reject the request to modify the communication session based on the response message from the charging system.

8. The network node of claim 6, wherein the interface is further configured to receive a response message from a first endpoint, the response message comprising an indication of whether the requested shift in charges is accepted or rejected.

9. The network node of claim 6, wherein:
the interface is further configured to:
transmit a query message comprising the charging preference to a first endpoint; and
receive an initial response message from the first endpoint, the initial response message does not provide an indication of whether the requested shift in charges is accepted or rejected;
the processor is further configured to determine from the initial response message that the first endpoint did not provide a suitable response to the query message; and
the interface is further configured to transmit a second message to the first endpoint, the second message comprising a reformatted request, the reformatted request indicative of the requested shift in charges and comprising a format different than the query message.

10. The network node of claim 6, wherein the first and second endpoints are in an established voiced communication session with one another and the requested modification of the media type associated with the communication session comprises adding video to the communication session.

11. A network node for shifting charges comprises a processor and non-transitory computer readable storage media, the storage media containing instructions executable by the processor, whereby when the instructions are executed the processor is operable to:
receive, from a first endpoint, a request for a communication session with at least a second endpoint;
during the communication session, receiving from the second endpoint a message comprising a request to modify a media type associated with the communication session, the message, the request comprising a charging preference indicating a request for a shift in at least a portion of the charges associated with the communication session, wherein the requested shift in at least a portion of the charges is based on the requested modification of the media type associated with the communication session;
transmit a message to a charging system indicative of the request for the shift in charges based on the charging preference;
determine whether to accept the request to modify the communication session between the at least two endpoints or to reject the request to modify the communication session between the at least two endpoints; and
based on the determination, facilitate in the modification of the communication session or maintaining without modification the communication session.

12. The network node of claim 11, wherein when the instructions are executed the processor is further operable to:
receive a response message from the charging system; and
determine whether to accept or reject the request to modify the communication session based on the response message from the charging system.

13. The network node of claim 11, wherein when the instructions are executed the processor is further operable to receive a response message from a first endpoint, the response message comprising an indication of whether the requested shift in charges is accepted or rejected.

14. The network node of claim 11, when the instructions are executed the processor is further operable to:
transmit a query message comprising the charging preference to a first endpoint;
receive an initial response message from the first endpoint, the initial response message does not provide an indication of whether the requested shift in charges is accepted or rejected;
determine from the initial response message that the first endpoint did not provide a suitable response to the query message; and
transmit a second message to the first endpoint, the second message comprising a reformatted request, the reformatted request indicative of the requested shift in charges and comprising a format different than the query message.

15. The network node of claim 11, wherein the first and second endpoints are currently in an established voiced communication session with one another and the requested modification of the media type associated with the communication session comprises adding video to the communication session.

\* \* \* \* \*